United States Patent [19]

Maher, III

[11] Patent Number: 5,689,721
[45] Date of Patent: Nov. 18, 1997

[54] DETECTING OVERFLOW CONDITIONS FOR NEGATIVE QUOTIENTS IN NONRESTORING TWO'S COMPLEMENT DIVISION

[75] Inventor: Robert D. Maher, III, Carrollton, Tex.

[73] Assignee: Cyrix Corporation, Richardson, Tex.

[21] Appl. No.: 626,574

[22] Filed: Apr. 2, 1996

Related U.S. Application Data

[63] Continuation of Ser. No. 492,966, Jun. 20, 1995, abandoned, which is a continuation of Ser. No. 64,507, May 18, 1993, abandoned.

[51] Int. Cl.$^6$ ........................................ G06F 7/52
[52] U.S. Cl. .................. 395/800; 364/736.5; 364/737; 364/748; 364/750.5; 364/761; 364/DIG. 2
[58] Field of Search ........................ 395/800, 250; 364/745, 750.5, 748, 761, 764, DIG. 1, 736.5, 737, DIG. 2

[56] References Cited

U.S. PATENT DOCUMENTS

| | | |
|---|---|---|
| 4,992,968 | 2/1991 | Adiletta ........................ 364/761 |
| 5,010,511 | 4/1991 | Hartley et al. ............... 364/786 |
| 5,097,435 | 3/1992 | Takahashi ..................... 364/761 |
| 5,272,660 | 12/1993 | Rossbach ..................... 364/748 |

FOREIGN PATENT DOCUMENTS

| | | |
|---|---|---|
| 0 351 829 | 1/1990 | European Pat. Off. |
| 2 266 607 | 11/1993 | United Kingdom. |

*Primary Examiner*—Alyssa H. Bowler
*Assistant Examiner*—Dzung C. Nguyen
*Attorney, Agent, or Firm*—Andrew S. Viger; John L. Maxin

[57] ABSTRACT

A method of detecting anomalous overflow conditions is used, in an exemplary embodiment, in implementing in a 486-type microprocessor, nonrestoring two's complement division for negative quotients using 2n bit dividends and n bit divisors. Each interative division step, an adder/subtractor is used to add/subtract the properly aligned divisor to/from the left shifted dividend, to produce a partial remainder and a carry out bit Cout. Complement Cout is assumed to be the same as the most significant bit of the partial remainder PR(MSB), such that PR(MSB) is used as the sign bit in further computations, with complement Cout being used to control quotient generation according to DVRS XOR Cout. The anomalous overflow test signals overflow when complement Cout is the different than the most significant bit of the first partial remainder PR1(MSB), such that the anomalous overflow test is implemented according to the logic equation: Cout XNOR PR1(MSB).

8 Claims, 1 Drawing Sheet

DETECTING OVERFLOW CONDITIONS FOR NEGATIVE QUOTIENTS IN NONRESTORING TWO'S COMPLEMENT DIVISION

The present application is a file wrapper continuation of application Ser. No. 08/492,966, filed Jun. 20, 1995, now abandoned, which was a file wrapper continuation of Ser. No. 08/064,507, filed May 18, 1993, now abandoned.

TECHNICAL FIELD

The invention relates generally to digital circuits, and more particularly relates to a method of detecting anomalous overflow conditions for negative quotients from nonrestoring two's complement division.

BACKGROUND

Microprocessor architectures include execution units that perform basic arithmetic operations such as addition, subtraction, multiplication, division, and shifting. These operations may use either signed or unsigned numbers—in the case of signed numbers (where the most significant bit is the sign bit), the most common form of representation is two's complement, although sign-magnitude is also used.

For division, the common approach is to use a substractive division algorithm that implements shift-and-subtract division, such as nonrestoring division, although some processor architectures (typically, floating point processors) implement division algorithms where multiplication is the iterative operator. Basically, conventional nonrestoring division involves iteratively substracting an n bit divisor from an appropriately shifted 2n bit dividend to obtain an n bit quotient and an n bit remainder—if the values of the dividend and the divisor are such that the quotient won't fit in n bits an overflow condition is signaled. By convention, any remainder should be of the same sign as the dividend and smaller in magnitude than the divisor.

Without limiting the scope of the invention, this background information is provided in the context of a specific problem to which the invention has application: for conventional nonrestoring division using two's complement numbers, ensuring detection of overflow conditions when and only when it is required.

Division algorithms in which subtraction is the iterative operator implement variations of basic pencil-and-paper division—in successive iterative steps, after appropriate shifting, the divisor is iteratively subtracted from the dividend or partial remainder to obtain a quotient digit and a new partial remainder, finally obtaining a full quotient and a final remainder that is zero or at least smaller in magnitude than the divisor. Each iteration, the maximum size of the partial remainder should be smaller by one digit than the previous partial remainder, subject to the constraint that, dividing a 2n bit dividend by an n bit divisor will not always yield a quotient that can be represented in only n bits, requiring an overflow condition to be signaled. See, for example, "Introduction to Arithmetic For Digital Systems Designers", S. Waser and M. Flynn, (Pub. 1982 CBS College Publishing) ("Waser/Flynn Reference").

For nonrestoring division, the basic process is (assuming positive dividend and divisor): after loading the dividend into a double length register and the divisor into a single length register aligned with the most significant n bits (or high order part) of the dividend, (a) in a first iterative step, left shift the dividend (i.e., multiply by 2) and subtract the divisor from the high order part to obtain a first partial remainder no larger than 2n-1 bits, and (b) in successive iterative steps, left shift the partial remainder and either (i) subtract the divisor if the partial remainder is positive, or (i) add the divisor if the partial remainder is negative. The general principle is that each iteration should bring the allowable range of the partial remainder closer to zero, i.e., the iterative process is repeated until the partial remainder converges to a final remainder that is zero or at least smaller in magnitude than the divisor.

For negative quotients (either dividend or divisor negative), the general principle remains that each iteration should bring the allowed range of the partial remainder closer to zero. Thus, the first iterative step requires an addition (or two oppositely signed numbers), followed by successive iterative steps in which the divisor is added or subtracted from the partial remainder depending on the their signs.

A quotient digit is generated in each iterative step, in signed digit representation, with the leading quotient digit being generated first. That is, in each step the quotient digit is (−1) if the sign of the partial remainder is different than the sign of the divisor, and (+1) if the two signs are the same, with these signed digits being conveniently assigned the binary code values of 0 for (−1) and 1 for (+1). Note that the corresponding logic representation of this quotient generation operation is:

DVRS XNOR PR(MSB)

or

DVRS XOR /PR(MSB)

where DVRS is the divisor sign, and PR(MSB) if the sign of the (algebraically correct) partial remainder. After the division operation is complete, the quotient is converted from this signed digit code to ordinary two's complement binary format. Alternatively, the conversion may be performed as the quotient digits are generated.

The dividend is sometimes referred to as the "zeroth partial remainder". In this patent, the term "partial remainder" designates a value obtained from subtracting/adding the divisor from/to the dividend or a previous partial remainder.

Overflow conditions result because dividing a 2n bit dividend by an n bit divisor will not always result in a quotient that will fit in n bits. Two types of overflow can occur: (a) absolute overflow where either the divisor is zero or the dividend is too large (in absolute value) for any divisor, and (b) relative overflow where the dividend is too large relative to the divisor.

In summary, nonrestoring two's complement division for an n bit divisor and a 2n bit dividend is conventionally accomplished in the following steps. In a first iterative step, the divisor is subtracted from or added to the left shifted dividend to obtain both the first partial remainder (PRI) and the leading quotient bit (based on DVRS XOR/PR1(MSB)). In each of the next n−1 iterative shift and subtract/add steps, the remaining quotient digits are generated based on whether the signs of the resulting partial remainder and the divisor are (i) different (quotient digit of "0"), or (ii) the same (quotient digit of "1"), i.e., based on DVRS XOR /PR (MSB). The final iterative step produces a final (uncorrected) remainder and a final (unadjusted) quotient. At least two additional steps are required to perform (a) remainder correction required by the convention that the remainder has the same sign as the dividend, and (b) a quotient adjustment to correlate the effects of remainder correction and completion of the conversion of the signed digit representation to binary two's complement. Tests for overflow are performed at various points in the iterative process, although some overflow conditions cannot be detected until the iterative steps are complete and the quotient is adjusted.

A specific object of the invention is to provide, for systems implementing nonrestoring two's complement division, a method for ensuring the comprehensive detection of overflow conditions.

SUMMARY

The invention is a method of detecting anomalous overflow conditions that occur in implementing nonrestoring two's complement division for negative quotients using 2n bit dividends and n bit divisors.

In one aspect of the invention, the method of detecting anomalous overflow involves: (a) in a first iterative step, shifting out the sign bit of the dividend and then adding the properly aligned divisor to obtain an n bit first partial remainder and a carry out Cout; (b) determining whether complement Cout is the same as the most significant bit of the first partial remainder PR1(MSB); and (c) if complement Cout and PR1(MSB) are not the same, signaling overflow. In effect, the step of determining whether complement Cout and PR1(MSB) are the same is determines whether shifting out the most significant bit of the first partial remainder results in the loss of valid data.

In another aspect of the invention, the method of detecting anomalous overflow involves: (a) in the first addition step, shifting out the sign bit of the dividend and then adding the properly aligned divisor to obtain a first partial remainder; (b) determining whether the first partial remainder is too large to fit in the leading 2n−1 bits of a 2n bit register; and then, (c) signaling overflow if the first partial remainder is too large; or (d) otherwise continuing with the division process.

In another aspect of the invention, the method of detecting anomalous overflow involves: (a) in the first addition step, shifting out the sign bit of the dividend and then adding the properly aligned divisor to obtain a first partial remainder; (b) determining whether the first partial remainder is so large in magnitude as to guarantee overflow for any n-bit divisor; and then, (c) signaling overflow if the first partial remainder is determined to be so that large; or (d) otherwise continuing with the division process.

In an exemplary embodiment of the invention, the method of detecting anomalous overflow conditions is used in implementing division operations in a microprocessor. Each iterative division step, an adder/subtracter is used to add/subtract the properly aligned divisor to/from the left shifted dividend, to produce a partial remainder and a carry out bit Cout. Complement Cout is assumed to be the same as the most significant bit of the partial remainder PR(MSB), allowing PR(MSB) to serve as the sign bit in further computations with complement Cout only being used to control quotient generation according to DVRS XOR Cout, and whether to add or subtract the divisor. The anomalous overflow test is implemented according to the logic equation: Cout XNOR PR1(MSB).

The technical advantages of the invention include the following. The overflow test of the invention supplements a conventional overflow test, and is designed to detect anomalous overflow conditions in cases that are masked by the conventional overflow test. Specifically, the anomalous overflow test signals overflow where, in calculating the first partial remainder, the sign position value of the dividend (which is lost by shifting out the sign bit) is not insignificant.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION

The detailed description of an exemplary embodiment of the anomalous overflow test method is organized as follows:
1. Nonrestoring Division
   1.1. Normal Overflow
   1.2. Anomalous Overflow
2. Anomalous Overflow Test
   2.1. Overflow Test Method
   2.2. Logic Implementation
3. Conclusion This organizational outline, and the corresponding headings used in this Detailed Description, are provided for convenience of reference only.

The exemplary overflow test method is used in a 32-bit 486-type microprocessor to implement a conventional nonrestoring division algorithm using twos complement numbers. Detailed description of conventional or known aspects of microprocessor systems, and implementations of division operations, are omitted so as to not obscure the description of the invention with unnecessary detail. In particular, basic implementation of nonrestoring division algorithms, including the conventional overflow detection techniques, is known to practitioners in the field of microprocessor design and will not be explained at length in this Detailed Description.

1. Nonrestoring Division.

This Detailed Description of an exemplary embodiment uses 8 bit two's complement numbers (with a range of −128 to +127), so that overflow conditions occur when a quotient cannot be represented in 8 bits with an 8 bit remainder (same signal as the dividend) that is smaller in magnitude than the 8 bit divisor. IN the exemplary 32-bit microprocessor, for division operations, the divisor (8, 16, or 32 bits) is loaded into a single length 32-bit register, while the dividend (16, 32, or 64 bits) is loaded into a double length 64-bit register—shift operations for the double length register are performed in accordance with the dividend size.

Figure 1:
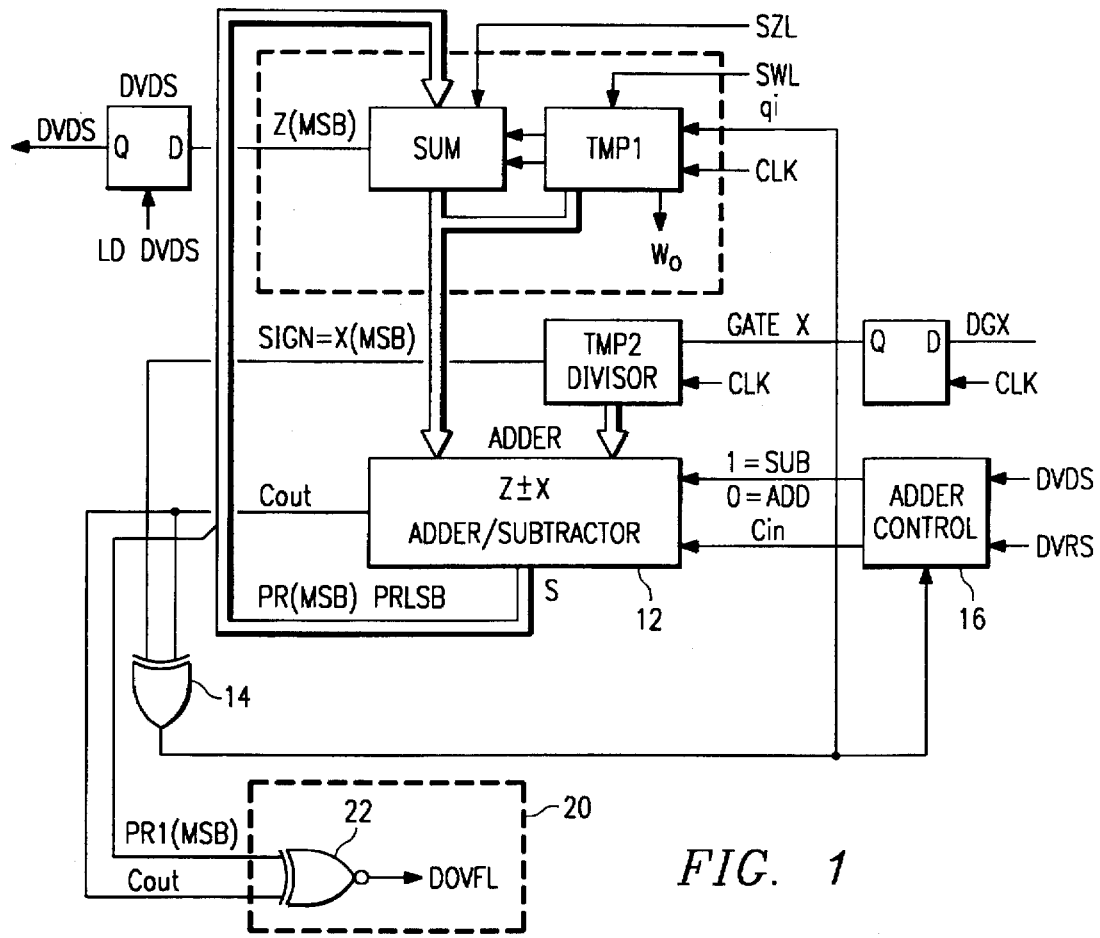
FIG. 1 illustrates a conventional hardware implementation for nonrestoring division, including overflow test logic for detecting anomalous overflow conditions according to the invention.

FIG. 1 illustrates a conventional hardware implementation for nonrestoring division, such as used in the exemplary embodiment. The 16 bit dividend is loaded into a double length register comprising a higher order 32-bit register SUM for holding the higher order 8 bit part of the dividend, and a lower order 32-bit register TMP1 for holding the lower order 8 bit part of the dividend. The 8 bit divisor is loaded into a single length 32-bit register TMP2. The 8/16 bit values are appropriately aligned in the registers which then effectively act as 8 and 16 bit registers.

A two's complement adder/subtractor 12 is used to perform the remainder reduction by addition and subtraction operations that generate the partial and final remainders, and also for remainder correction and quotient adjustment. The left input of the adder/subtracter can be sourced from either the SUM or the TMP1 register (sourcing from TMP1 will only occur during quotient adjustment).

During each iteration of the division process, each shift-and-add/subtract cycle is begun by left shifting the value in high order register SUM and the value in the lower order register TMP1—the most significant bit of SUM is shifted out, and the most significant bit of TMP1 is shifted into the least significant bit of SUM. For the first shift-and-add/subtract operation, the shifted out sign bit of the dividend DVDS is latched into a latch DVDS for use in overflow detection, and determination of the first add or subtract operation for the first partial remainder formation.

The values in SUM and TMP1 are input to adder/subtract 12. For the example of 8/16 bit division, each addition/subtraction iteration results in an 8 bit partial remainder with a carry out Cout (the low order bit of the partial remainder are not affected by the addition/subtraction). The partial remainder is loaded back into the SUM register in preparation for the next shift-and-add/subtract cycle. The carry out is not used in the next shift-and-add/subtract operation, but is used in quotient generation, and in determination of the next add or subtract operation for remainder reduction.

The basic shift-and-add/subtract operation for two's complement nonrestoring division is described in the Background. During each iterative step, quotient bits should be generated according to:

$$DVRS\beta/PR(MSB)$$

where $\beta$ means XOR, DVRS is the dividend sign; and /PR(MSB) is the complement of the leading bit of the feedback partial remainder.

Conventional hardware implementations for nonrestoring division, such as illustrated in FIG. 1, assume that the most significant bit of the partial remainder PR(MSB) is the same as complement Cout, allowing PR(MSB) to serve as the sign bit in further computations with complement Cout only being used to control (a) quotient generation, and (b) whether to add or subtract the divisor. Thus, the quotient generation operation is accomplished according to:

$$DVRS\beta Cout$$

using XOR gate 5 (i.e., DVRSβ/(/Cout)). The quotient digits are stored back into TMP1.

In each iteration, the operation of adder/subtract 12 in adding or subtracting the divisor is controlled by adder control logic 14. For the first iteration, this control logic is responsive to DVRS and DVDS to add (in the case of negative quotients) the dividend and the divisor. For subsequent iterations, this control logic is responsive to the quotient digit for the previous iteration (i.e., sent back to the TMP1 register).

The division operation is completed by performing remainder correction and quotient adjustment, as well as overflow detection. Remainder correction involves either ***(assuming a negative quotient): (a) for a negative dividend and positive remainder, subtracting the divisor from the final unadjusted remainder, or (b) for a positive dividend and negative remainder, adding the divisor to the final remainder. Quotient adjustment then correlates the incrementation of the quotient (associated with remainder correction) with the completion of conversion of the coded signed digit quotient to two's complement (effectively involving adding a 1 or a 0 to the unadjusted quotient).

1.1. Conventional Overflow Detection.

For the exemplary embodiment, conventional divide overflow detection is implemented as follows. In a first clock cycle corresponding the first iterative step of the division operation, the first partial remainder is obtained and the first quotient digit Q(MSB) is generated. An overflow check is performed this time according to:

$$DVDS\beta(DVRS\beta Q(MSB))$$

where $\beta$ means XOR, DVDS is the sign of the dividend, DVRS is the sign of the divisor, and Q(MSB) (i.e., DVRSβCout) is the most significant quotient bit. Specifically, Q(MSB) designates the leading quotient as converted to two's complement except for the final possible change by a full carry ripple from the final quotient adjustment step).

The result of this initial overflow check is latched into a divide overflow check latch DIVCHK. If DIVCHK is set, then overflow MAY occur, depending on the results of further overflow test. Specifically, if DIVCHK is set, then:

| CASE | DVDS | DVRS | RESULT (ASSUMING DIVCHK SET) |
|------|------|------|------------------------------|
| 1 | + | + | Overflow will occur |
| 2 | − | + | Overflow will occur only if the quotient is 01111111 and quotient adjustment fails to cause an addition ripple to 10000000 (fails to correct the sign) |
| 3 | + | − | Overflow will occur only if the quotient is 01111111 and quotient adjustment fails to cause an addition ripple to 10000000 (fails to correct the sign) |
| 4 | − | − | Overflow will occur |

Note that Case 1 is resolved by this initial overflow check. Note that for Cases 2 and 3, Q(MSB) must be a zero. Also note that for Cases 2 and 3, if any iteration after the first generates a zero before quotient adjustment, then overflow must occur.

For Case 4, if DIVCHK is not set, then overflow can also occur when the unadjusted quotient is 01111111 and quotient adjustment causes an addition ripple to 10000000 (erroneously changing the sign).

To determine if the Q(MSB) criteria for each of the cases is met, the following overflow test are performed in the same clock cycle as DIVCHK. For Cases 2 and 3 (where the final quotient should be negative), an overflow check latch OVCHK23 is set if Q(MSB) is 0, according to the equation:

$$/Q(MSB) \cdot (DVDS\beta DVRS)$$

where • means product. For Case 4 (where the final quotient should be positive), an overflow check latch OVCHK4 is set if Q(MSB) is zero, according to the equation:

$$/Q(MSB) \cdot DVDS \cdot DVRS$$

In the subsequent iterative steps of the division operation, the overflow test for cases 2, 3, and 4 involves detecting whether the resulting quotient bit pattern is all ones, and if so, the affect of quotient adjustment. For Cases 2 and 3, if DIVCHK and OVCHK23 are set, and if a subsequent iterative step generates a quotient digit of zero, then overflow must occur, according to the equation:

if (DIVCHK•OVCHK23)

then $$DOVFL = /Q(i) + DOVFLp$$

where DOVFL is a divide overflow latch, and DOVFLp is the state of this latch from the previous iteration. For Case 4, if a subsequent iterative step generates a quotient digit of zero, then overflow cannot occur, as represented by the state of the OVCHK4 latch, according to the equation:

$$OVCHK4 = Q(i) \cdot OVCHK4p$$

where OVCHK4p is the state of the OVCHK4 latch from the previous iteration.

After the iterative shift-and-add/subtract process is complete, the final unadjusted quotient is adjusted by adding a quotient correction bit DIVCIN (one or zero):

$$DIVCIN = (DVRS \cdot /DVDS) \text{ OR}$$
$$(/DVRS \cdot DVDS \cdot /DZR) \text{ OR}$$
$$DVRS \cdot DVDS \cdot DXR$$

where DZR is the state of a zero remainder flag generated in a conventional manner if a zero remainder is produced during the division process. Note that the first term (DVRS•/DVDS) is Case 3 (negative divisor and positive dividend), the second term (/DVRS•DVDS•/DZR) is Case 2 (positive divisor and negative dividend), and the third term is Case 4 (negative divisor and dividend).

The final overflow test can be performed during either remainder correction or quotient adjustment, and involves determining whether quotient adjustment will cause a 1 to be added to the quotient, based on the state of DIVCIN. Overflow is signaled if: (a) for Cases 2 and 3, the quotient digit pattern is 01111111 and DIVCIN is not one, meaning no correction of the sign; and (b) for Case 4, the quotient digit pattern is 01111111 and DIVCIN is one, meaning erroneous conversion of the sign. This overflow test is represented by the following equation:

if DIVCIN•(OVCHK23•DIVCIN)

or if DIVCIN•(OVCHK4•/DIVCIN) then DOVFL=1

1.2. Anomalous Overflow Detection.

In conventional hardware implementations of nonrestoring division, certain anomalous overflow conditions for negative quotients are not detected by conventional overflow tests. For example, these anomalous overflow conditions, which result in an erroneous divide result, occur in 386- and 486-type microprocessors manufactured by Intel Corporation and certain 486-type microprocessors Cyrix Corporation (the assignee of this invention).

Figure 2A:
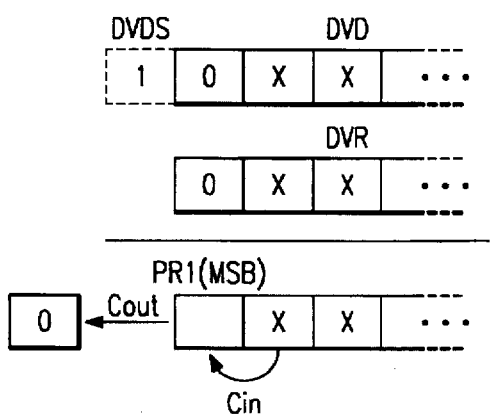
FIGS. 2a and 2b illustrate the alignment of the most significant bits of the left-shifted dividend and divisor in the first shift-and-add operation, and the corresponding bit patterns that will result in anomalous overflow.
Figure 2B:
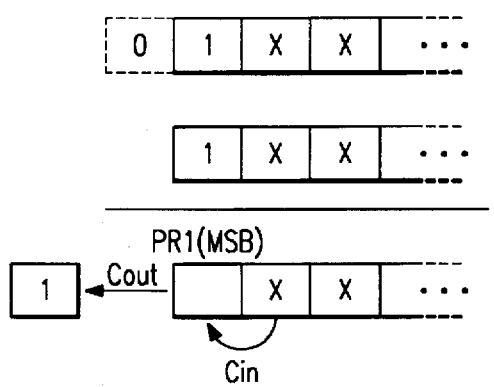

Referring to the FIG. 1, these anomalous overflow conditions arise because in the conventional hardware implementation of nonrestoring division, complement Cout is assumed to be the same as the most significant bit of the FIGS. 2a and 2b illustrate the alignment of the most significant bits of the left-shifted dividend and the divisor in the first shift-and-add operation, and the corresponding bit patterns that will result in anomalous overflow. In both FIGUREs, the dividend DVD is added to the divisor DVR to obtain the first partial remainder PR1, with a carry-out Cout. The initial left shift of the dividend results in the sign DVDS being shifted out, so that it is not used in the first addition.

Referring to FIG. 2a, consider the dividend bit pattern of 10XX—XX—which is a large negative number. For a negative quotient, the divisor must be positive, so that it will have a bit pattern of 0XX—XX.

To perform the first shift-and-add operation, the dividend is shifted left one bit, shifting out the DVDS of one, and shifting into the most significant position a zero. Adding the MSBs for DVD and DVR will result in: (a) a carry-out of zero, and (b) a most significant partial remainder bit PR1 (MSB) that depends on the carry-in Cin to PR1(MSB).

Consider the case where carry-in to PR1(MSB) is zero. That means that the next LSB for either or both of DVD and DVR must be zero: (a) if the next LSB for DVD is zero (i.e., 100X—XX including the shifted out DVDS), then DVD is a very large negative number that should cause overflow for any divisor, or (b) if the next LSB for DVR is zero (i.e., 00X—XX), then DVR is a positive number that relative to a large or very large negative dividend will cause overflow. By the same analysis, if the carry-in to PR1(MSB) is a one, either the magnitude of DVD is small enough, or the magnitude of DVR is large enough, that the quotient may not overflow.

Thus, if the addition of DVD and DVR results in a carry-in to PR1(MSB), PR1 is negative, which is indicated by the carry-out of 0, i.e., Cout complement is 1. However, if the addition does not result in a carry-in to PR1(MSB), the carry-out of one indicates a negative partial remainder, even though the PR1(MSB) if a 0 which indicates a positive partial remainder.

Referring to FIG. 2b, consider the dividend bit pattern of 01XX—XX— which is a large positive number. For a negative quotient, the divisor must be negative, so that it will have a bit pattern of 1XX—XX.

To perform the first shift-and-add operation, the dividend is shifted left one bit, shifting out the DVDS of zero, and shifting into the most significant position a one. Adding the MSBs for DVD and DVR will result in: (a) a carry-out of one, and (b) a most significant partial remainder bit PR1 (MSB) that depends on the carry-in Cin to PR1(MSB).

Consider the case where carry-in to PR1(MSB) is one. That means that the next LSB bit for either or both of DVD and DVR must be a one, and: (a) if the next LSB for DVD is one (i.e., 011X—XX including the shifted out DVDS), then DVD is a very large positive number that should cause overflow for any divisor, or (b) if the next LSB for DVR is one (i.e. 11X—XX), then DVR is a small negative number that relative to a large or very large positive dividend will cause overflow. By the same analysis, if the carry-in to PR1(MSB) is a zero, either the magnitude of DVD is small enough, or the magnitude of DVR is large enough, that the quotient will not overflow.

Thus, if the addition of DVD and DVR does not result in a carry-in to PR1(MSB), PR1 is positive, which is indicated by the carry-out of one, i.e., Cout complement is 0. However, if the addition does result in a carry-in to PR1 (MSB), the carry-out of one indicates a positive partial remainder, even though the PR1(MSB) is a 1 which indicates a negative partial remainder.

Accordingly, the two cases that should cause overflow are: (a) for a negative dividend and positive divisor, a carry-in to PR1(MSB) does not occur, and (b) for a positive dividend and negative divisor, a carry-in to PR1(MSB) does occur. Specifically, in both of these cases, the relative magnitudes of the dividend and the divisor are such that overflow should occur—DVD is either large or very large in magnitude, the DVR is relatively small in magnitude.

However, because complement Cout is ignored, these anomalous bit patterns for the dividend and the divisor result in a first partial remainder PR1 that is negative but should be positive, or visa versa. In both cases, the truncation of complement Cout causes the loss of significant data.

As a result of the loss of significant data, this operation could generate a quotient bit pattern of 01111111 that as a result of quotient correction (i.e., adding a 1) would be converted into 10000000, which would appear to be a valid negative quotient. In particular, this quotient will pass the conventional overflow test for Cases 2 and 3, and the system will erroneously not signal overflow.

That is, dividends and divisors that can be represented by the most significant bit patterns in FIGS. 1a and 1b result in anomalous overflow conditions in which an erroneous result in the computation of the first partial remainder is then masked by subsequent operations that prevent then from being detected by conventional overflow tests.

As an example, consider the Case 2 division operation: −20,232/30. In twos complement hex, this operation is B0F8/1E. In hex, the division algorithm generates quotient digits as follows (in the Values column, the value in parentheses is the preceding value shifted left by one with the sign bit shifted out):

| OP | CARRY | VALUE | Q BITS |
|---|---|---|---|
| + | 0 | B0F8 (61F0) 1E | 0 |
| + | 1 | 7FF0 (FFE0) 1E | 1 |
| − | 1 | 1DE0 (3BC0) 1E | 1 |
| − | 1 | 1EC0 (3D80) 1E | 1 |
| − | 1 | 1F80 (3F00) 1E | 1 |
| − | 1 | 2100 (4200) 1E | 1 |
| − | 1 | 2400 (4800) 1E | 1 |
| − | 1 | 3A00 (5400) 1E | 1 |
| | | 3600 | REM |

The final (unadjusted) binary quotient fits the Case 2 bit pattern of 01111111. Quotient adjustment introduces a carry-in of 1 that causes a ripple conversion of the quotient to 10000000, which is interpreted as the maximum allowable negative quotient. Thus, this overflow condition is masked, and not recognized by the conventional overflow test.

2. Anomalous Overflow Test.

The invention is a method of detecting the anomalous overflow conditions described in Section 1.1. The anomalous overflow test is designed to detect, for negative quotients, those instances where, in the initial add operation, the truncation of complement Cout results in the loss of valid data. As a result, the first partial remainder is incorrect, allowing the further generation of the quotient digit pattern of 01111111 (Case 2 or 3). Quotient adjustment may cause a ripple into the Q(MSB), erroneously converting the quotient to a valid negative quotient 10000000, which masks this anomalous overflow condition from being detected by a conventional overflow test.

2.1. Overflow Test Method.

For an exemplary embodiment, the overflow detection method of the invention involves: (a) after a first partial remainder is obtained, determining (i) the most significant bit of the resulting partial remainder PR1(MSB), and (ii) the resulting carry-out bit Cout; and then (b) signaling overflow if PR1(MSB) and Cout are the same. Referring to FIGS. 1a and 1b, the effect of this anomalous overflow test is that overflow is detected and signaled for negative quotients where either: (a) for a negative dividend and positive divisor, the shift out of the dividend sign bit is not compensated for by a carry-in to the MSB of the partial remainder PR1, and (b) for a positive dividend and negative divisor, a carry-out from PR1 is replaced with a carry-in to PR1. Because these cases represent overflow conditions that must occur because of the relative sizes of the dividend and the divisor, overflow can be signaled immediately.

For the exemplary embodiment, the anomalous overflow test of the invention is combined with a conventional overflow test to ensure proper overflow detection, even in cases of anomalous overflow. Because the anomalous overflow test is able to signal overflow based only on the results of the computation of the first partial remainder, it can be performed in the first clock cycle of the conventional overflow test, along with the initial tests for OVCHK23 and OVCHK4. The logic equation is:

$$DOVFL = PR1(MSB)\beta/Cout$$

where PR1(MSB)β/Cout is the anomalous overflow test according to the invention.

2.2. Logic Implementation.

In an exemplary embodiment of the invention, the overflow detection method is used in implementing conventional twos complement nonrestoring division, including overflow detection.

Referring to FIG. 1, the overflow detection logic is indicated generally at 10. To avoid burdening the Figure with unnecessary detail, all of the logic implementations for the conventional overflow detection described in Section 1.1 have not been represented in block 10. Given the description in Section 1.1, including logic equations, providing the same or equivalent overflow detection logic as used in the exemplary embodiment is a matter of routine design.

The logic implementation for detecting anomalous overflow conditions according to the invention, and the exemplary embodiment described in Section 2.1, is shown in the block 20. From Section 2.1, the logic equation is:

$$DOVFL = PR1(MSB)\beta/Cout$$

where PR1(MSB)β/Cout is the anomalous overflow test. Thus, the exemplary logic implementation includes an XNOR gate 22. During the first iteration cycle, XNOR 22 receives the most significant bit of the first partial remainder PR1(MSB) and the resulting carry-out Cout from ADDER. If the output of XNOR 22 is high, overflow DOVFL will be signaled.

3. Conclusion.

Although the Detailed Description of the invention has been directed to certain exemplary embodiments, various modifications of these embodiments, as well as alternative embodiments, will be suggested to those skilled in the art. For example, specific register structures, mappings, bit assignments, and other implementation details are set forth solely for purposes of providing a Detailed Description of the exemplary embodiment of the invention. However, the invention has general applicability to implementing nonrestoring two's complement division. Various modifications based on trade-offs between hardware and software logic, and various equivalent implementations of the logic equations given in the Detailed Description, will be apparent to those skilled in the art.

The invention encompasses any modifications or alternative embodiments that fall within the scope of the Claims.

I claim:

1. In a system with iterative divide circuitry for performing nonrestoring division using two's complement 2n bit signed dividends and two's complement n bit signed divisors, overflow detection circuitry for detecting overflow conditions specifically in cases that yield two's complement negative quotients, comprising:

iterative divide circuitry that receives a signed dividend and a signed divisor of opposite signs, when a resulting quotient is negative; and first and second overflow detection circuitry coupled to the iterative divide circuitry;

in a first iterative step, the iterative divide circuitry shifts out a sign bit of the signed dividend, and then adds the signed divisor, properly aligned, to obtain a first partial remainder, and a carry out bit which is designated Cout;

the first overflow detection circuitry providing in response to the first partial remainder and Cout a first overflow signal if the magnitude of the first partial remainder causes an overflow condition to occur for any n-bit divisor;

if the first overflow detection circuitry does not provide the first overflow signal, the iterative divide circuitry is operable (i) to perform a sequence of iterative divide steps using successive partial remainders and the signed divisor to obtain a sequence of quotient digits and successive partial remainders, and then (ii) to provide an adjusted signed quotient;

the second overflow detection circuitry being responsive to the adjusted signed quotient to provide a second overflow signal if the adjusted signed quotient cannot be stored in two's complement format in an n bit register;

whereby the first and second overflow signals identify all cases of overflow.

2. The system of claim 1, wherein the first overflow detection circuitry receives (i) Cout, and (ii) a most significant bit of the first partial remainder which is designated PR1(MSB), and provides the first overflow signal if the complement of Cout is not the same as PR1(MSB).

3. The system of claim 2, wherein the first overflow detection circuitry is implemented according to: (PR1(MSB))XNOR(Cout).

4. The system of claim 1, wherein the first overflow detection circuitry determines whether the magnitude of the first partial remainder causes an overflow condition to occur for any n-bit divisor by determining whether the first partial remainder cannot be stored in two's complement format in the leading 2n-1 bits of a 2n bit register.

5. In a system with iterative divide circuitry for performing nonrestoring division using two's complement 2n bit signed dividends and two's complement n bit signed divisors, overflow detection circuitry for detecting overflow conditions specifically in cases that yield two's complement negative quotients, comprising:

iterative divide means for receiving a signed dividend and a signed divisor of opposite signs, when the quotient is negative;

in a first iterative step, the iterative divide means shifting out a sign bit of the dividend, and then adding the divisor, properly aligned, to obtain a first partial remainder and a carry out bit designated Cout;

first overflow detection means coupled to the iterative divide means for providing in response to the first partial remainder and Cout a first overflow signal if the magnitude of the first partial remainder causes overflow to occur for any n-bit divisor;

if the first overflow detection means does not provide the first overflow signal, the iterative divide means is operable (i) to perform a sequence of iterative divide steps using successive partial remainders and the signed divisor to obtain a sequence of quotient digits and successive partial remainders, and then (ii) to provide an adjusted signed quotient;

second overflow detection means for providing, responsive to the adjusted signed quotient, a second overflow signal if the adjusted signed quotient cannot be stored in twos complement format in an n bit register;

whereby the first and second overflow signals identify all cases of overflow.

6. The system of claim 5, wherein the first overflow detection means receives (i) Cout, and (ii) a most significant bit of the first partial remainder designated PR1(MSB), and provides the first overflow signal if the complement of Cout is not the same as PR1(MSB).

7. The system of claim 6, wherein the first overflow detection means is implemented according to: (PR1(MSB))XNOR(Cout).

8. The system of claim 5, wherein the first overflow detection means determines whether the magnitude of the first partial remainder causes overflow to occur for any n-bit divisor by determining whether the first partial remainder cannot be stored in two's complement format in the leading 2n-1 bits of a 2n bit register.

* * * * *